United States Patent [19]

Frungel et al.

[11] Patent Number: 4,511,249

[45] Date of Patent: Apr. 16, 1985

[54] MICROPROCESSOR-DRIVEN LASER CEILOMETERS

[76] Inventors: Frank Frungel, Herwigredder 105a, 2000 Hamburg 56, DE; Jürgen Rohr, Barmbeker Str. 163, 2000 Hamburg 60, DE, both of Fed. Rep. of Germany

[21] Appl. No.: 543,782

[22] Filed: Oct. 20, 1983

Related U.S. Application Data

[63] Continuation of Ser. No. 225,968, Jan. 14, 1981, abandoned.

[51] Int. Cl.³ .................. G01C 3/08; H01J 40/14; H01L 9/00
[52] U.S. Cl. ........................................ 356/5; 250/553; 356/1; 356/4
[58] Field of Search ............. 250/553, 552, 214 AL, 250/214 B, 214 C; 356/1, 4, 5

[56] References Cited

U.S. PATENT DOCUMENTS

| | | | |
|---|---|---|---|
| 3,619,058 | 11/1971 | Hewlett et al. | 356/5 |
| 3,691,390 | 9/1972 | Chow et al. | 250/553 |
| 3,779,645 | 12/1973 | Nakazawa | 356/4 |
| 3,815,994 | 6/1974 | Peckham | 356/5 |
| 3,830,567 | 8/1974 | Riegl | 356/5 |
| 4,077,718 | 3/1978 | Graham, Jr. et al. | 356/5 |
| 4,259,592 | 3/1981 | Frungel et al. | 356/5 |

FOREIGN PATENT DOCUMENTS 2346183  9/1973  Fed. Rep. of Germany .......... 356/5

Primary Examiner—S. C. Buczinski
Attorney, Agent, or Firm—Michael J. Striker

[57] ABSTRACT

An improvement to a laser ceilometer and like instruments comprises a laser diode array which includes a plurality of laser diodes, and an array driver driving the laser diode array in accordance with commands from a microprocessor. The laser diodes are GaAs diodes. By utilizing the improvement, service life and reliability of the ceilometer are both increased.

7 Claims, 3 Drawing Figures

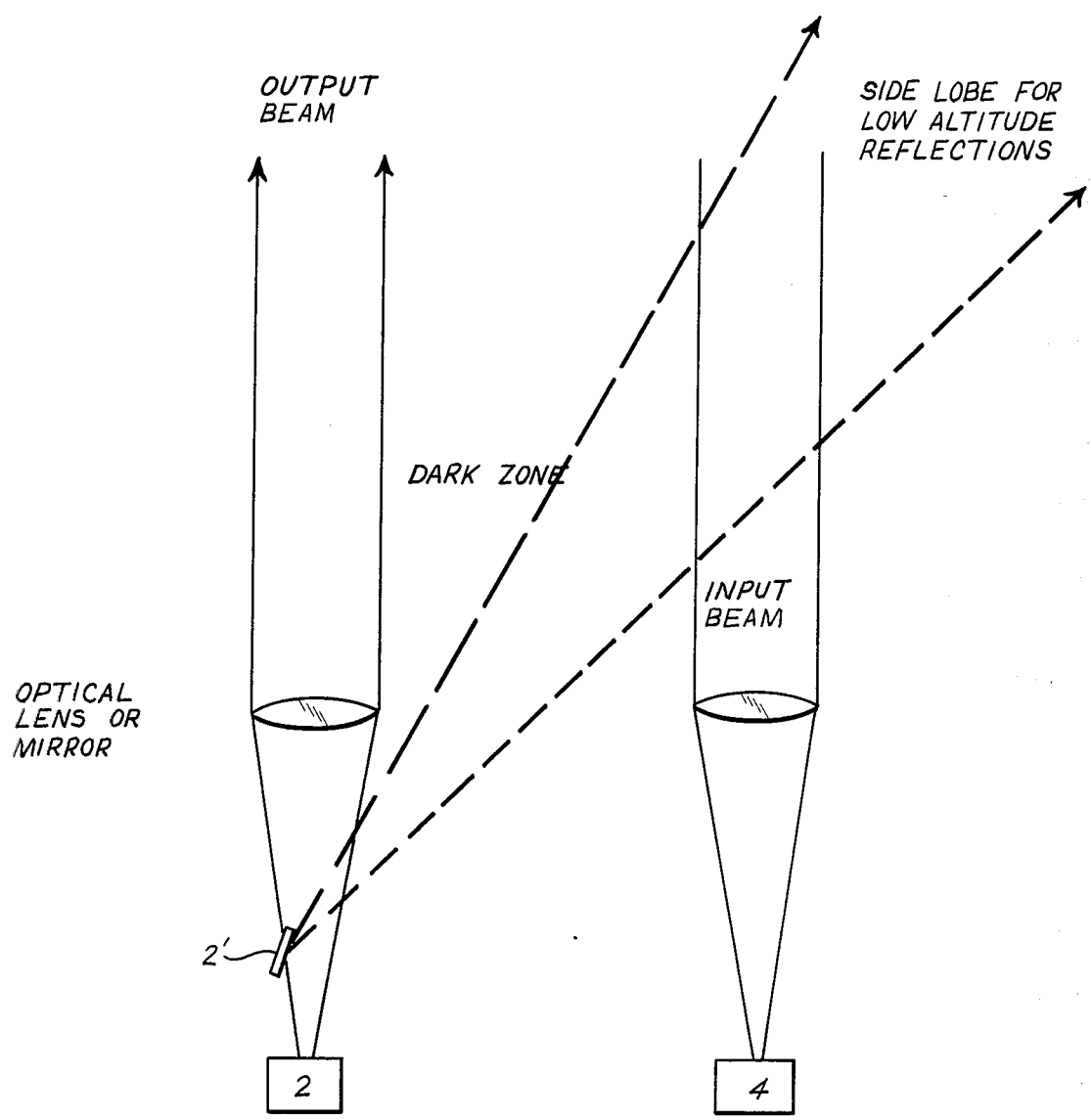

MICROPROCESSOR-DRIVEN LASER CEILOMETERS

This application is a continuation of application Ser. No. 225,968, filed Jan. 14, 1981, now abandoned.

BACKGROUND OF THE INVENTION

1. Field of the Invention

This invention pertains to laser ceilometers and like instruments which include microprocessors that drive the instruments. More particularly, this invention pertains to an improvement to such laser ceilometers which is designed to increase their service life and reliability.

2. Description of the Prior Art

Laser ceilometers, such as those disclosed by the inventors herein in abandoned application Ser. No. 915,444, filed June 14, 1978 and pending application Ser. No. 24,779, filed Mar. 28, 1979, utilize laser diodes to direct radiation upwardly towards any clouds which may be present. This radiation then reflects off such clouds, and returns back to the laser ceilometer to be incident upon a photosensitive element, such as an avalanche photodiode. By measuring the time required for the radiation to be received at the photosensitive element, it is possible to ascertain cloud height.

In devices of this type, the laser diodes are usually pulsed rather than beam operated continuously. While the frequency with which the laser diode is pulsed may vary in accordance with a program executed by a microprocessor in the ceilometer itself, the laser diode is typically pulsed on the order of four times per minute for a period of perhaps 70 nanoseconds at a frequency of about 2.37 kHz. Typically, each pulse will have a power of approximately 20 watts.

Thus, it can be seen that the reliability of the instrument is limited by the reliability of the single laser diode used. It would therefore be advantageous to provide an improvement to a laser ceilometer which would have an increased service life not limited by the service life of a single laser diode.

SUMMARY OF THE INVENTION

This object, among others which will appear hereinafter, is achieved in this invention by utilizing a commercially-available laser diode array instead of a single laser diode. The laser diode array is driven by an array driver which is connected both to the laser diode array and to a microprocessor which operates the laser ceilometer itself. During operation, at least one laser diode in the laser diode array is operated at one time. If more than one laser diode is simultaneously operated, the overall output from the laser diode array will be less dependent upon the accurate functioning of any individual laser diode, increasing reliability.

Advantageously, the laser diode array includes a plurality of fiber optics which are all connected together at one end to a beam output window. The ends of the fiber optics not so connected are themselves connected to individual laser diodes in the laser diode array. Inasmuch as the surface of the beam output window is thereby increased, a wider beam of laser radiation is emitted out of the ceilometer. This simplifies alignment of the avalanche photodiode which is used as a photosensitive element.

Further advantageously, the individual laser diodes within the laser diode array are protected from the effects of direct sun light by a shutter which can be opened and closed by a solenoid in response to a detection of excessive sun light by a sensor. The shutter will only open when sun light incident upon the laser diode array is insufficiently intense to cause any damage thereto. Otherwise, the shutter remains closed and protects the laser diode array.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a schematic representation of an arrangement for illuminating a dark zone between output and input light beams.

DETAILED DESCRIPTION OF PREFERRED EMBODIMENTS

Figure 1:
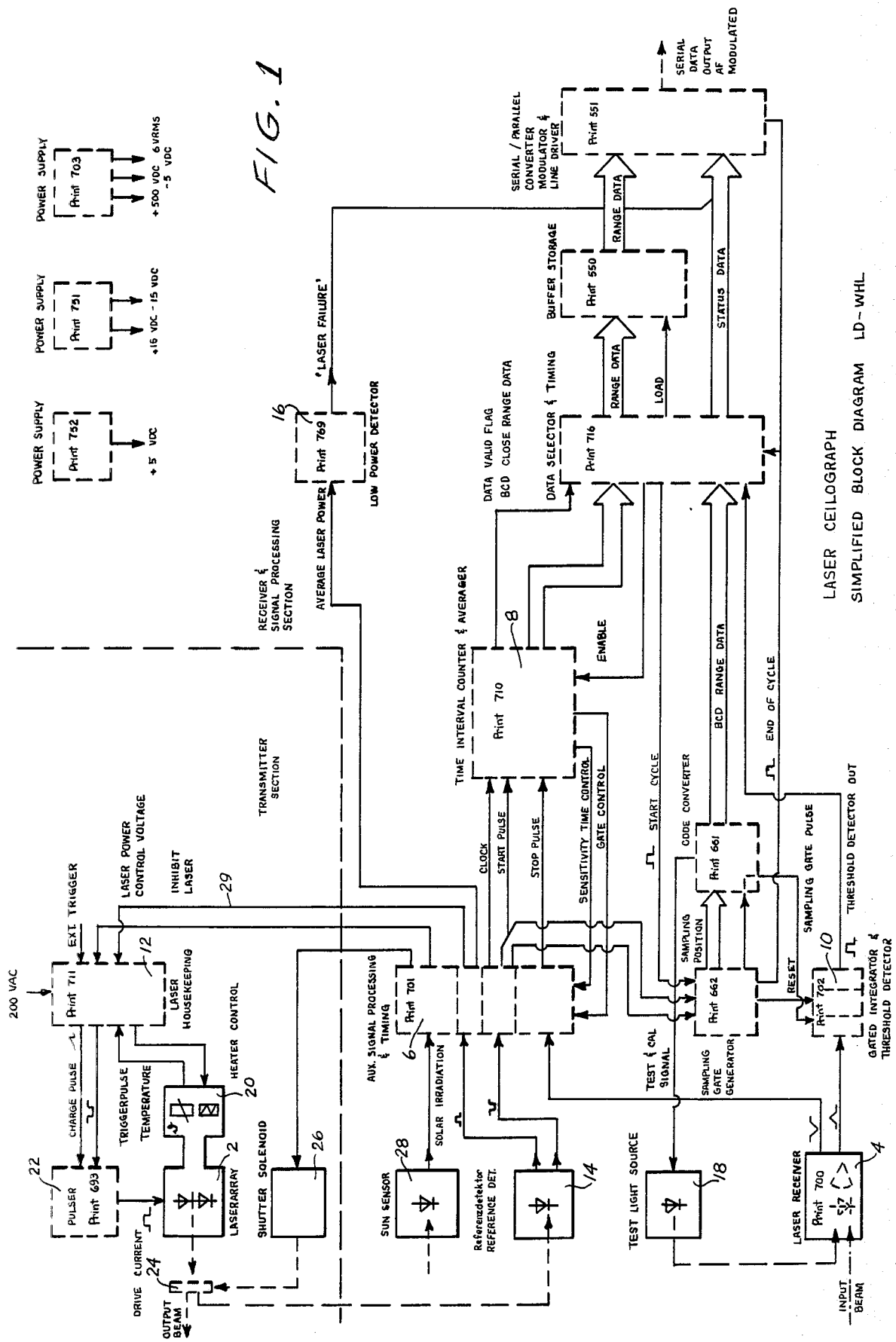
FIG. 1 is a simplified block diagram of a laser ceilometer in which the invention has been installed.

Referring first to FIG. 1, a laser diode array generally indicated by reference numeral 2 and described in more detail hereinafter, is pulsed by pulses of current having an amplitude which is approximately 25 to 30 amperes and which lasts for a duration of approximately 80 nanoseconds. Laser radiation emitted from laser diode array 2 is directed upwardly towards any clouds which may be present. In the event that clouds are present, some of the laser radiation from laser diode array 2 will reflect off the clouds and eventually impinge upon avalanche photodiode 4. By use of a microprocessor which includes a signal processor 6 and a timer 8, the period of time between emission of pulses from laser diode array 2 and receipt of pulses at avalanche photodiode 4 can be computed. This period of time is a measure of cloud height, and can be used to generate cloud height information that is out of the device and used to drive a digital display (not shown) or a tape recorder (not shown) or both.

In practice, as cloud height increases, intensity of laser radiation on avalanche photodiode 4 decreases. As a result, it may be necessary to integrate the output of avalanche photodiode 4 in integrator 10 after more than one pulses has been applied to laser diode array 2. Techniques for synchronizing integration of the output of avalanche photodiode 4 with pulses of current applied to laser diode array 2 are known in the art as gating techniques, and will not be described further, since such techniques are already known and in use.

An array driver 12 is connected to laser diode array 2 and drives all laser diodes therein. As a result, output from laser diode array 2 is made less dependent upon failure of any individual laser diode. Laser radiation from laser diode array 2 is caused to be incident upon reference detector 14, which is connected to the microprocessor. The microprocessor computes the power output of laser diode array 2 and determines, in low power detector 16, whether or not the output from laser diode array 2 is sufficiently intense. In the event that such output is too low, that information can be used to inform a user of a malfunction of laser diode array 2 by any suitable indicator, such as a lamp (not shown). In a similar fashion, avalanche photodiode 4 can be tested by periodically energizing test light source 18, to likewise indicate proper or improper operation of avalanche photodiode 4.

It is known to those skilled in the art that laser diodes only operate properly if they are kept within a suitable temperature range. In order to maintain laser diode array 2, within this range (which here is approximately 30° to 35° C. in order to keep the wavelength of laser radiation from laser diode array 2 to approximately 908 nanometers) a heater and thermostat 20 is placed in intimate thermal contact with laser diode array 2. Unless laser diode array 2 is kept within this temperature range, array driver 12 will prevent any pulsing of laser diode array 2 by pulser 22.

Inasmuch as direct sun light can damage laser diode array 2 if the sun light is sufficiently intense, radiation emitted from laser diode array 2 is caused to pass through a shutter 24. Shutter 24 has an open state and a closed state, and is opened and closed by shutter solenoid 26. Shutter solenoid 26 operates in response to the output of sun sensor 28, which may be a photoresister, a photocell, a photodiode, or any other suitable photosensitive element. Sun sensor 28 will cause shutter solenoid 26 to close shutter 4 in the event that directly vertical sun light is sufficiently intense to damage laser diode array 2. Otherwise, shutter 24 is kept open so that radiation emitted from laser diode array 2 can be emitted out of the ceilometer and used to measure cloud height.

As is known in the art, ceilometers of the type in question here measure cloud height in a stepwise fashion by gating avalanche photodiode 4 in such a fashion that the microprocessor awaits an output therefrom during predetermined intervals of time. Thus, this ceilometer (which measures from the top of its range to the bottom of its range) only registers radiation incident upon avalanche photodiode 4 if that radiation is detected within a certain maximum interval of time. If an output from avalanche photodiode 4 is not so detected within this interval of time, the interval of time is shortened and the process repeated once again. This process continues to take place until such time as a cloud has been detected. For example, when low clouds have been detected, their measurement is completed already within 2–3 seconds. Thereafter, the laser diode array is automatically disconnected and only after a time interval of 15 seconds minus 2 or 3 seconds that with after 12 or 30 seconds, the laser array 2 is reactivated so that the prescribed four measurements per minute are fulfilled. If no cloud has been detected, cloud height is above the maximum range of the ceilometer and a cloudless condition is therefore assumed to exist.

In the event that clouds are either non-existent or located above the maximum range of the ceilometer (which here is approximately 5,000 feet) it is unlikely that clouds will suddenly appear. As a result, it is not necessary to monitor cloud height with the same continuity that would be necessary if clouds were indeed detected. The ceilometer here in question executes a measuring operation from the top of its range to the bottom of its range in 15 seconds. Each measuring operation from top to bottom takes place in 50 foot intervals, i.e. the ceilometer first determines if clouds are located 4950–5000 feet above ground, and then determines if clouds are located between 4900–4950 feet above ground, and so forth until clouds have or have not been detected. In a cloudless condition, the repeated pulsings of laser diode array 2 are superfluous, since it is unlikely that cloudiness will change from cloudlessness to cloudiness under 5,000 feet with any great speed. In order to prevent superfluous pulsing of laser diode array 2, the microprocessor is programmed so that if no clouds are detected or if clouds are only very infrequently detected, laser diode array 2 will be pulsed in a repeated sequence, in which laser array diode 2 is pulsed twice at 30-second intervals and then is pulsed four times at 15-second intervals. This further reduces the demands on laser diode array 2. However, since such operation may come into conflict with regulations and statutes promulgated by administrative agencies or governmental entities, this program in the microprocessor can be overridden so that laser diode array 2 carries out measurements every 15 seconds.

Figure 2:
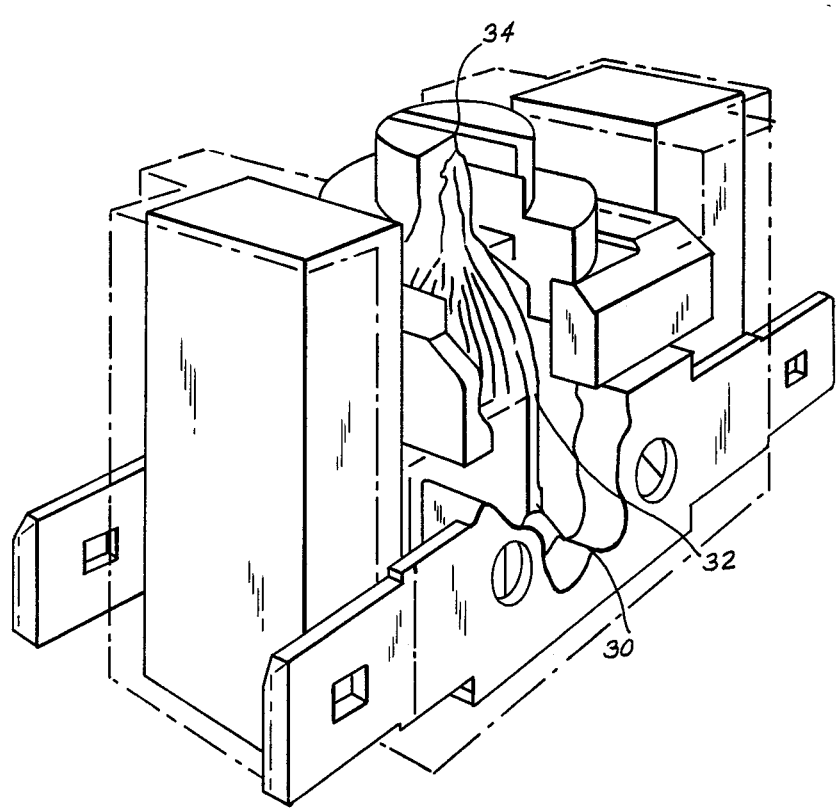
FIG. 2 is a drawing of the laser diode array used in the invention.

Turning to FIG. 2, it can be seen that a large number of GaAs laser diodes 30 are all located in a horizontal plane and are spaced apart from each other to facilitate cooling. Fiber optics 32 extend between each individual laser diode 30 to a beam output window 34 which has dimensions of 250 micrometers by 230 micrometers. Inasmuch as the area of beam output window 34 is comparatively large (as compared with the area of beam emission from a single laser diode of about 350 micrometers by 2 micrometers) alignment of avalanche photodiode 4 is not critical and a single avalanche diode with a diameter of about 1 millimeter can be utilized. The avalanche photodiode is protected against bright daylight by an optical narrow-band filter the bandwidth of which is great enough to allow the transmission of the chirping laser diode pulses resulting from the spontaneous temperature rise in the laser diodes.

The laser diode array 2 is a single replaceable unit which can be attached to a suitable heat sink (not shown) to insure that overheating does not take place.

In the preferred embodiment of this invention, the laser diode array including the associated pulse driving circuitry is a replaceable unit with such narrow mechanical tolerances that its play is smaller than 1/1000 of the focal length of the engaged optical lens-or mirror system. In another modification, there is provided an additional optically reflecting or refracting element 2' (FIG. 3) between the laser diode array and the optical transmitting system, for projecting a small amount of the laser radiation into a side lobe towards a narrow zone ahead of the receiver/transmitter preferably below about 30 meters to illuminate the dark zone before intersection of the two narrow beam radiation patterns of projector and receiver, to enable the system to receive and evaluate reflections from very low cloud patches and fog, filling the gap between zero and 30 meter cloud altitude.

It is alternatively possible to utilize laser diode arrays other than the one shown in FIG. 2. So-called "stacked arrays" or "stepped arrays" may be also be utilized. However, these alternative constructions are not preferred at this time due to heat dissipation considerations.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An automated self-checking long lived laser ceilometer including a transmitter and a receiver, said transmitter comprising a laser diode array consisting of a plurality of laser diodes; an electronic pulse generator having an input and an output and being set for driving respective laser diodes of said array at less than the normal maximum pulse peak power and/or repetition rate; an auxiliary photosensitive feed-back control member receiving at said transmitter a part of the laser light emitted by said transmitter for feed-back controlling the input of said pulse generator, the feed-back control being dimensioned in such a way that dropping of the emitted laser power due to aging or a failure of a laser diode is continuously compensated by higher input of said pulse generator; and an analogue or digital power indicator coupled to the output of said pulse generator to show the measure of fading of said laser diode array, thereby enabling the user for provide a timely replacement of said laser diode array.

2. The ceilometer as defined in claim 1, further including an electro-magnetically actuated optical shutter with an open state and a closed state which blocks sun light from direct incidence upon the laser diode array; and an auxiliary photosensitive element mounted near the light emitting spot of said laser diode array, preferably a photoresistor, for controlling said optical shutter.

3. The ceilometer as defined in claim 1 with two similar optical systems for receiver and transmitter, the receiver having signal processing means and data converting means, which are connected to a microprocessor including program memory and random access memory programmed for enabling said microprocessor to switchoff the pulse generator which energizes the laser diode array in the transmitter, after a lack of reception of any cloud signals during a predetermined time (blue sky condition) and repeating after preset time intervals a short transmitted laser pulse burst and observing again for the existence or non-existence of signals coming back from the sky.

4. The ceilometer as defined in claim 1 with two similar optical systems at receiver and transmitter, the transmitter transmitting uninterrupted laser pulses at a predetermined repetition rate and peak power, the receiver preferably by help of an avalanche photodiode, feeding a microprocessor with related memories and evaluating programs, sampling the clouds by judging range and percentage of signal reception, and finally indicating the cloud cover percentage at different cloud levels.

5. The ceilometer as defined in claim 1, further including an electro-magnetically actuated optical shutter with an open state and a closed state which blocks sun light from direct incidence upon the laser diode array; and an auxiliary photosensitive element mounted near the light emitting spot of said laser diode array, preferably a photoresistor for controlling said optical shutter.

6. The ceilometer as defined in claim 1, and further comprising an additional optically reflecting or refracting element between said laser diode array and the optical transmitting system, for projecting a small amount of the laser radiation into a side lobe towards a narrow zone ahead of the receiver/transmitter preferably below about 30 meters to illuminate the dark zone before intersection of the two beam patterns of projector and receiver, to enable the system to receive and evaluate reflections from very low cloud patches and fog, filling the gap between zero and 30 meter cloud altitude.

7. An improvement to microprocessor-controlled laser ceilometers, laser ceilographs and like instruments which include at least one microprocessor a transmitter and a receiver which improvement is designed to increase service life, reliability and versatility, said transmitter comprising a laser diode array consisting of a plurality of laser diodes; an electronic pulse generator having an input and an output and being set for driving said array by constant, normally underrated pulse peak power and/or repetition rate; an auxiliary photosensitive feed-back control member receiving at said transmitter a part of the laser light emitted by said transmitter for feed-back controlling the input of said pulse generator, the feed-back control being dimensioned in such a way that dropping of the emitted laser power due to aging is continuously compensated by higher input of said pulse generator; an analogue or digital power indicator coupled to the output of said pulse generator to show the measure of fading of said laser diode array, thereby enabling the user to provide a timely replacement of said laser diode array; and the laser diode array including the associated pulse driving circuitry being a replaceable unit with such narrow mechanical tolerances that its play is smaller than 1/1000 of the focal length of the engaged optical lens- or mirror system.

* * * * *